United States Patent [19]

Arnould et al.

[11] Patent Number: 4,675,836

[45] Date of Patent: Jun. 23, 1987

[54] DISCRETE COSINE TRANSFORM CALCULATION PROCESSOR

[75] Inventors: Emmanuel Arnould, Villarceaux; Jean-Pierre Dugre, San Clemente, both of France

[73] Assignee: Compagnie Industrielle des Telecommunications Cit-Alcatel, Paris, France

[21] Appl. No.: 709,856

[22] Filed: Mar. 8, 1985

[30] Foreign Application Priority Data

Mar. 9, 1984 [FR] France ............................. 84 03665

[51] Int. Cl.⁴ ......................................... G06F 15/332
[52] U.S. Cl. ................................................. 364/725
[58] Field of Search ........................... 364/725; 358/133

[56] References Cited

U.S. PATENT DOCUMENTS

| | | | |
|---|---|---|---|
| 4,196,448 | 4/1980 | Whitehouse et al. | 364/725 |
| 4,288,858 | 9/1981 | Merola et al. | 364/725 |
| 4,293,920 | 10/1981 | Merola | 364/725 |
| 4,385,363 | 5/1983 | Widergren et al. | 364/725 |
| 4,449,194 | 5/1984 | Wilhelm | 364/725 |

OTHER PUBLICATIONS

Nussbaumer, "Fast Multidimensional Discrete Cosine Transforms" *IBM Tech. Disclosure Bulletin*, vol. 23, No. 5, Oct. 80, pp. 1976–1981.
Nussbaumer, "Improved Approach for the Computation of Multidimensional Cosine Transforms" *IBM Tech. Discl. Bulletin*, vol. 23, No. 10, Mar. '81, pp. 4517–4521.
IEEE Transactions on Communications, vol. COM-25, No. 9, Sep. 1977, W. H. Chen et al., "A Fast Computational Algorithm for the Discrete Cosine Transform", pp. 1004–1009.
IEEE Transactions on Electromagnetic Compatibility, vol. EMC-24, No. 2, May 1982, A. Jalali et al.: "A High Speed FDCT Processor for Real Time Processing of NTSC Color TV Signal", pp. 278–286.
IEEE Transactions on Computers, vol. C-31, No. 9, Sep. 1982, F. A. Kamangar et al., "Fast Algorithsm for the 2-D Discrete Cosine Transforms", pp. 899–906.

*Primary Examiner*—David H. Malzahn
*Attorney, Agent, or Firm*—Sughrue, Mion, Zinn, Macpeak & Seas

[57] ABSTRACT

A discrete cosine transform calculation processor, suitable for compressing a television signal, comprises a processor module consisting of four successive stages. The first stage, the input stage of the module, comprises a first adder/subtracter. The second stage comprises a second adder/subtracter with two input buses each selectively connected to an output bus of the first stage or to an output bus of an input register of the second stage, loaded from an output bus of the first or fourth stage. The third stage comprises a multiplier connected to a cosine/sine function value store and to an output bus of the second stage. The fourth stage, the module output stage, comprises a third adder/subtracter with two input buses each selectively connected to an output bus of the third stage or to an output bus of an input register of this stage loaded from the multiplier.

3 Claims, 3 Drawing Figures

DISCRETE COSINE TRANSFORM CALCULATION PROCESSOR

BACKGROUND OF THE INVENTION

1. Field of the Invention

The present invention relates to discrete cosine transform calculation processors, employed in particular in real time compression systems for transmitting digital television picture signals over limited bandwidth links.

2. Description of the Prior Art

The use of digital coding and compression techniques for processing television picture signals to be transmitted without significant degradation over limited bandwidth links is already known. Certain of these techniques provide for real time processing of a television picture signal and yield satisfactory results both with regard to transmitted picture quality and the compression ratio obtained, using two-dimensional discrete cosine transform calculations. For the purposes of such calculations, the television picture signal is divided into successive matrix blocks of $N \times N$ non-overlapping digital picture elements. These blocks are converted into successive sets of the $N \times N$ two-dimensional discrete cosine transform coefficients which, quantified and coded, are then transmitted over the line. By applying the property of separating the discrete cosine transform into two dimensions, the calculation of these transforms reduces to one-dimensional discrete cosine transform calculations.

The discrete cosine transform of a sequence of N data points i (j) where j=0, ... N−1 is a sequence of N transformed data points I(k) where k=0, ... N−1, also called coefficients, which are expressed by the equation:

$$I(k) = \frac{2c(k)}{N} \sum_{j=0}^{N-1} i(j) \cos \frac{2j+1}{2N} k\pi$$

where $k = 0, \ldots N - 1$ and in which $c(k) = 1/\sqrt{2}$ for $k = 0$
$c(k) = 1$ for $k = 1, \ldots N - 1$ The discrete cosine transform calculation for a sequence of N data points is carried out by executing a time sequence of real operations in the form of an algorithm. One of these algorithms, usable for N=2n where n is equal to 2 or more and of the type known as a "butterfly" algorithm, is given in an article entitled "A Fast Computational Algorithm for the Discrete Cosine Transform" by Wen-Hsiung, Chen, C. Harrison-Smith and S. C. Fralick published in IEEE Transactions on Communications, September 1977. It breaks down the processing of the N data points of the sequence to be transformed to obtain the corresponding N coefficients, ignoring a normalization factor, into a limited number of successive stages each yielding N results. These steps consist in addition or subtraction operations carried out on appropriate pairs of data points from the sequence to be transformed or appropriate pairs of results from the step directly preceding that in question, and in multiplying the results of a step, preceding that in question, by a cosine or sine function followed by operations of addition or subtraction either on one of the results of these multiplications and one of the preceding step results or on two of the results of these multiplications, taken in suitable pairs in both cases.

A calculation processor implementing an algorithm deduced from the preceding algorithm, referred to as that of W. H. Chen et al, is published in the article "A High-Speed FDCT Processor for Real-Time Processing of NTSC Color TV Signal" by Ali Jalali and K. R. Rao in IEEE Transactions on Electromagnetic Compatibility, Vol EMC-24, No 2, May 1982. This processor, designed for processing sequences of picture elements of a television picture signal, is of modular structure operating overall in pipeline mode. It comprises three types of operator module assigned to three different sets of operations to be carried out during all stages of processing the picture elements of a sequence. One of these modules, called the simple module, has two inputs and is assigned to an addition/subtraction operation. A second module, called the composite module, has four inputs and is assigned to multiplying two of the inputs by a cosine/sine function and addition/subtraction of these products and to addition/subtraction of each of the other two inputs with one of these products. The third module, called the basic module, has two inputs and is assigned to multiplying each of the inputs by a cosine/sine function and to the addition/subtraction of these products. These various modules are under the control of a programmed store module providing for the simultaneous functioning of the various operator modules and the exploitation of the results which each of them produces by the next module or at the outputs of the last module.

The overall structure of a processor of this kind is complex, utilizing numerous addition/subtraction units and numerous multiplication units.

Another calculation processor implementing an algorithm also derived from the algorithm of W. H. Chen et al published in IEEE Transactions on Communications and also designed for processing a television picture signal is described in American U.S. Pat. No. 4,302,775. The modified algorithm disclosed in this patent breaks down the set of calculations to be carried out on N picture elements into successive stages each producing N results. Thus for transforming 16 picture elements (N=16), the modified algorithm disclosed in this American patent recommends an organization of the set of calculations into five successive stages, the first assigned to operations of addition or subtraction on appropriate pairs of input picture elements, the second assigned to operations identical to that of the first stage but applying to appropriate pairs of results of said first stage, the third assigned to multiplying the preceding results by constants (defining cosine or sine values and able to take the values ±1) and addition or subtraction of pairs of the products obtained, the fourth assigned to operations of addition or subtraction on pairs of results of the third stage, and the fifth assigned to multiplying each of the preceding results by constants (defining values of a cosine or sine function) and addition of pairs of the products obtained.

The resulting processor thus comprises five sets of operator circuits disposed one after the other and assigned to the operations carried out according to the five successive processing stages as defined hereinabove. The processor as a whole is synchronized to the incoming timing rate of the input picture elements, but each set of operator circuits has its own control signals derived from the input picture element timing rate. This processor is of complex structure since it functions in pipeline mode.

An object of the present invention is to define a simplified architecture for a discrete cosine transform calculation processor for calculating the transform of a sequence of N digital data points, using a modified algorithm based on that of W. H. Chen et al which yields a compact and readily integrated final structure.

SUMMARY OF THE INVENTION

The invention consists in a discrete cosine transform calculation processor for calculating the transform of a sequence of N digital data points where $N=2^n$ and n is an integer greater than two, comprising four successive calculation stages each assigned to a single operation and together constituting a processor module controlled by a programmed store, wherein a first stage, the module input stage, comprises a first addition/subtraction unit with two input buses receiving the data points to be processed in successive pairs and an output bus delivering the results; a second stage comprises a second addition/subtraction unit with two input buses and an output bus, first and second addressable storage registers each associated with a respective one of said input buses of said second addition/subtraction unit, and multiplexer circuits selectively loading said first and second registers from said output bus of said first stage or from an internal loopback bus of the module and feeding each input bus of said second addition/subtraction unit from said output bus of said first stage or the associated register; a third stage comprises a multiplication unit having an output bus and two input buses respectively connected to an associated addressable store holding sine and cosine function values and to said output bus of said second stage; and a fourth stage, the module output stage, comprises a third addition/subtraction unit having two input buses and an output bus to which said loopback bus is connected to load selectively said first and second registers, third and fourth addressable storage registers each associated with one of said input buses of said third addition/subtraction unit and loaded selectively from said output bus of said third stage, and multiplexer circuits selectively feeding each input bus of said third addition/subtraction unit from said output bus of said third stage or the associated register.

In accordance with one characteristic of the invention, this processor, for calculating the two-dimensional transform of blocks of $N \times N$ digital picture elements of a picture signal, further comprises a set of first, second and third stores individually controlled in read and write modes by said programmed store and associated with said module, a respective incoming and outgoing words multiplexer and a respective store addressing multiplexer for each store controlled by said programmed store to connect sequentially said first store, which has two access ports, in reach mode and said second store, which also has two access ports, in read mode to said two input buses of said first stage of said module, and then said second store in write mode and then said third store in write mode, during the same stages, to said output bus of said output stage of said module to transfer the module result words.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
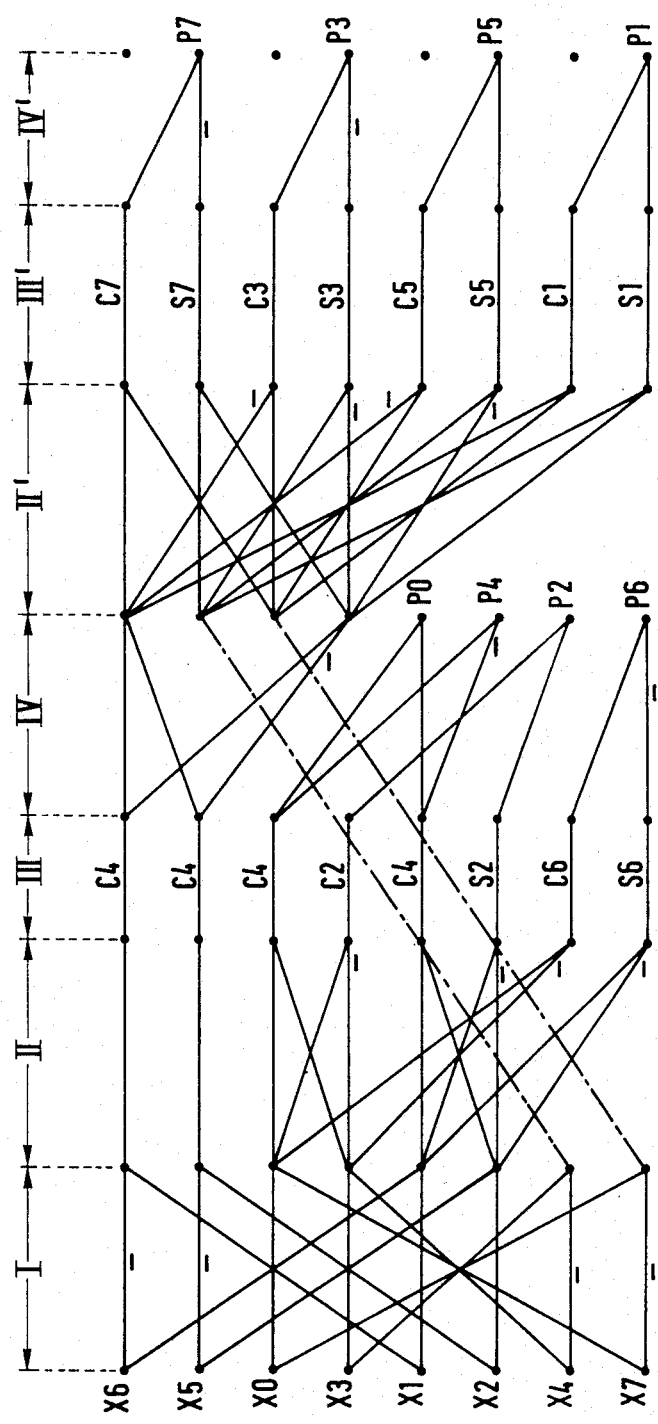
FIG. 1 is a diagram of a modified algorithm in accordance with the invention for calculating the discrete cosine transform of a sequence of N data points.

In FIG. 1, showing a modified algorithm for calculating the discrete cosine transform of a sequence of N data points (N picture elements where $N=8$, for example), it is seen that the calculations to be carried out are grouped into successive stages in each of which the same operation is repetitively executed in N successive clock periods. These operations comprise:

- in the first stage I, addition or subtraction operations on appropriate pairs of input data points denoted X0 through X7,
- in the second stage II, addition or subtraction operations on the results obtained at the output of stage I, in the form of appropriate pairs in the case of some of them and individually in the case of others of them, in order simply to carry the latter forward,
- in the third stage III, multiplying the results of stage II by cosine or sine functions of defined values denoted Ci or Si where $Ci = \cos i\pi/16$ and $Si = \sin i\pi/16$ for $i = 1, 2, \ldots 7$,
- in the fourth stage IV, adding or subtracting the results of the preceding stage III taken in appropriate pairs,
- in the fifth stage II', adding or subtracting some of the results from stage IV and some of the results from stage II and indicated in chain-dotted line at the input to this stage, the results processed being taken in suitable pairs,
- in the sixth stage III', multiplying the results from the preceding stage II' by cosine or sine functions of defined values Si and Ci, and
- in the seventh stage IV', adding or subtracting appropriate pairs of results from stage III'.

Ignoring a normalization factor, the N coefficients of the discrete cosine transform, denoted P0 through P7, are obtained during stages IV and IV' for four of the eight processing clock periods.

Figure 2:
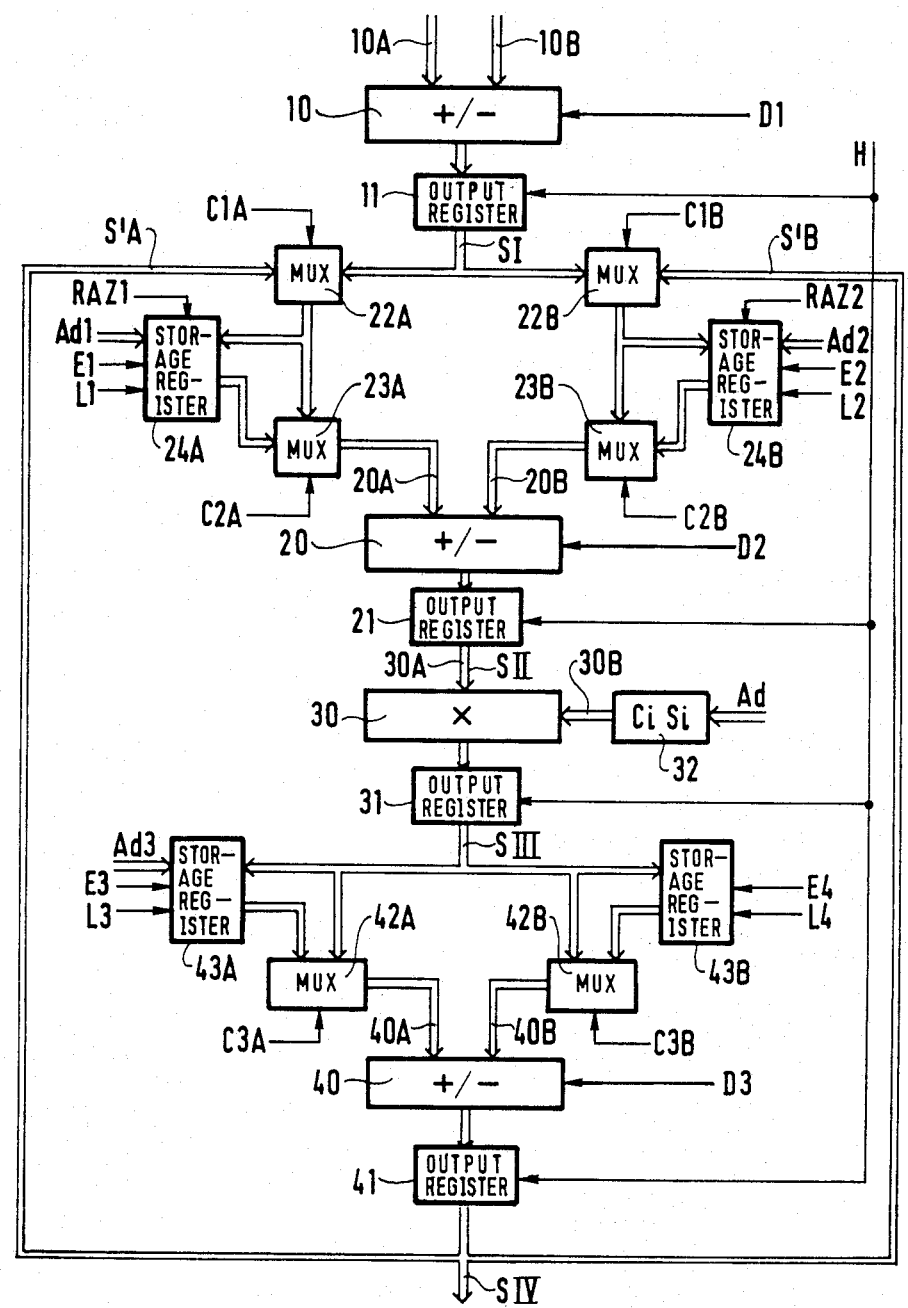
FIG. 2 is a block diagram of a one-dimensional discrete cosine transform calculation processor in accordance with the invention.

The processor of FIG. 2 carries out the successive calculations illustrated in the diagram of FIG. 1, exploiting the similar nature of the group formed by calculation stages II, III and IV and that formed by calculation stages II', III', and IV' and processing operations carried out in a deferred manner between the two groups of stages to define a very simple processor module structure.

Thus the processor shown in FIG. 2 comprises four successive calculation stages essentially comprising in the case of the first or input stage a first addition/subtraction unit 10, in the case of the second stage, a second addition/subtraction unit 20, in the case of the third stage a multiplication unit 30 and, in the case of the fourth or output stage, a third addition/subtraction unit 40. Respective output registers 11, 21, 31 and 41 of the four stages triggered by one of the edges of a clock signal H deliver the results computed by the stage in question.

Each of these addition/subtraction and multiplication units has two input buses referenced by the reference number assigned to the unit concerned with the suffix A and B and an output bus to the associated output register, this output bus being designated by the letter S to which is appended a Roman number I, II, III, IV corresponding to the identifiers of the successive stages given with or without the "prime" symbol (') in the diagram of FIG. 1. The addition/subtraction units 10, 20 and 40 each further receive an addition/subtraction control signal designated D1, D2 or D3 according to the unit 10, 20 or 40 in question.

In this processor module, which has two data input buses constituted by the buses 10A and 10B and one output bus constituted by the bus SIV, the arithmetic unit 20 of the second stage has one of its input buses 20A connected through two first multiplexer circuits 22a, 23A in cascade either to the output bus SI of the first stage or to an output bus of an associated storage register 24A. This storage register 24A is itself loaded through the multiplexer circuit 22A, either from said first stage through the bus SI or from the fourth stage through a bus S'A internal to the module, called the loopback bus and connected to the bus SIV. These multiplexer circuits 22A, 23A each receive a control signal C1A or C2A for the selective connections to be set up between the various aforementioned buses. The second input bus 20B of the arithmetic unit 20 is analogously connected to two second multiplexer circuits 22B and 23B in cascade with which are associated a second storage register 24B and another internal loopback bus S'B connected to the output bus SIV of the fourth stage. These second multiplexer circuits have respective control signals C1B, C2B which provide a selective connection between the buses SI, S'B, 20B and the input and output bus of the associated storage register 22B.

Each of the storage registers 24A and 24B is able to memorise a plurality of data words or results issued from SI or SIV. In the given example they consist of three stages. Each receives a write control signal E1 or E2, a read control signal L1 or L2, a reset to zero signal RAZ1 or RAZ2 and an addressing control signal Ad1 or Ad2 to load, read or reset to zero an addressed one of their stages.

The multiplier 30 has one of its input buses 30A connected directly to the output bus SII of the second stage. Its second input bus 30B is connected to an associated cosine and sine function store 32 storing defined values Ci and Si of these functions where $Ci = \cos i\pi/16$ and $Si = \sin i\pi/16 (N=8)$ and controlled by an addressing signal Ad.

The arithmetic unit 40 of the fourth stage has one of its input buses 40A connected through a third multiplexer circuit 42A either to the output bus SIII of the third stage or to an output bus of an associated storage register 43A. This register 43A is itself loaded from the bus SIII connected to its input bus. A control signal C3A applied to the multiplexer circuit 42A provides selective routing between the bus SIII, the output bus of the register 43A and the bus 40A. The capacity of the register 43A is sufficient to memorise several successive words or results delivered on SIII; in the example in question it has two stages. It receives a write control signal E3, a read control signal L3 and an addressing signal Ad3 to load or read each of its stages as appropriate.

The second input bus 40B of this unit 40 is analogously connected through a fourth multiplexer circuit 42B either to the bus SIII or to the output bus of another associated storage register 43B. This register 43B is loaded from the bus SIII subject to the control of a write signal E4 which is applied to it; it also receives a read control signal L4 whereas the multiplexer circuit 42B receives a control signal C3B providing selective connection of the bus SIII and the output bus of this register 43B to the bus 40B. In the embodiment shown, the capacity of this register 43B is equal to one word from bus SIII.

A control programmed store (not shown) provides the external addressing, writing and reading control signals for the storage registers 22A, 22B, 42A and 42B, the reset to zero signals RAZ1 and RAZ2 for the storage registers 24A and 24A, the addressing signal for the cosine and sine store 32, the control signals D1, D2 and D3 for the arithmetic units 10, 20 and 40 and the control signals C1A, C2A, C1B, C2B, C3A and C3B for the multiplexer circuits. The input data or digital picture elements to be processed and the clock signal H defining the successive operating cycles of each of the processing stages for the output of the intermediate results or coefficients are produced by a main controller circuit (not shown) also driving the control programmed store.

In this processor module, input picture elements are defined on 8 bits and the intermediate results and coefficients are defined on 12 bits. The module therefore has a structure with 12-bit internal buses between stages, two 8-bit data input buses and one 12-bit output bus.

The operation of the processor and the execution of the processing are explained in Tables I and II hereinafter with reference to successive operating cycles 1, 2, 3, . . . defined by the signal H. In these tables there is indicated for a sequence of eight picture elements Xi to be processed (i=0, 1, . . . 7) taken in suitable pairs on the input buses 10A and 10B the successive results (denoted Li, Mi, Ni, Pi in particular) obtained at the outputs of the various calculation stages and/or stored in the respective stages R1, R2 or R3 of the storage registers. There are also outlined the processing operations carried out on a new sequence of picture elements succeeded the preceding one at the input of the processor module, the picture elements and results relating to this new sequence which appear in these tables bearing the same reference codes as their counterparts in the preceding sequence accompanied by the "prime" symbol (').

In these tables, the symbol "." represents a "don't care" state and the intermediate results denoted Li, Mi and Ni and the coefficients deoted Pi obtained from the picture elements Xi may be defined as follows:

| | |
|---|---|
| L0 = X0 + X7 | M0 = L0 + L3 |
| L1 = X1 + X6 | M1 = L1 + L2 |
| L2 = X2 + X5 | M2 = L1 − L2 |
| L3 = X3 + X4 | M3 = L0 − L3 |
| L4 = X3 − X4 | M4 = L4 |
| L5 = X2 − X5 | M5 = C4 L6 − C4 L5 |
| L6 = X1 − X6 | M6 = C4 L6 + C4 L5 |
| L7 = X0 − X7 | M7 = L7 |
| N0 = C4 M0 + C4 M1 | P0 = N0 |
| N1 = C4 M0 − C4 M1 | P4 = N1 |
| N2 = S2 M2 + C2 M3 | P2 = N2 |
| N3 = C6 M3 − S6 M2 | P6 = N3 |
| N4 = M4 + M5 | P1 = C1 N7 + S1 N4 |

-continued

| | |
|---|---|
| N5 = M4 − M5 | P5 = C5 N6 + S5 N5 |
| N6 = M7 − M6 | P3 = C3 N6 − S3 N5 |
| N7 = M7 + M6 | P7 = C7 N7 − S7 N4 | where $Ci = \cos i\pi/16$ and $Si = \sin i\pi/16$ with $i = 1, 2, \ldots 7$.

These two tables show how this processor module comprising three adder/subtracters, a single multiplier, nine stages of storage register each with a capacity of one 12-bit word, six bus multiplexers and a cosine and sine value store executes the various calculations sequentially on the eight picture elements of successive sequences of eight picture elements, these sequences possibly being, for example, successive rows from a matrix block of 8×8 picture elements. This structure provides for a one-dimensional discrete transform calculation on the eight picture elements Xi of each row of the matrix block which are applied to it in eight cycles H denoted 1 through 8 and delivers the corresponding coefficients Pi in 16 cycles H denoted 6 through 21 for the first row, that is in 128 successive cycles H for processing the eight rows, following overall initialization of the process executed during five cycles denoted 1 through 5.

It will be noted that the coefficients Pi thus obtained are not normalized. To obtain normalized coefficients which are equal to the products Pi multiplied by the normalization factor 2/N it is sufficient, the number N being of the form 2n where n is an integer, simply to shift the bits defining the coefficients Pi by (n−1) positions, that is to say two positions in this instance, towards the least significant bits. This shifting is simply obtained in practice by reducing the weight of the bits delivered at the output of the module in a ratio 2n−1, that is to say in a ratio of 4 in this instance.

Figure 3:
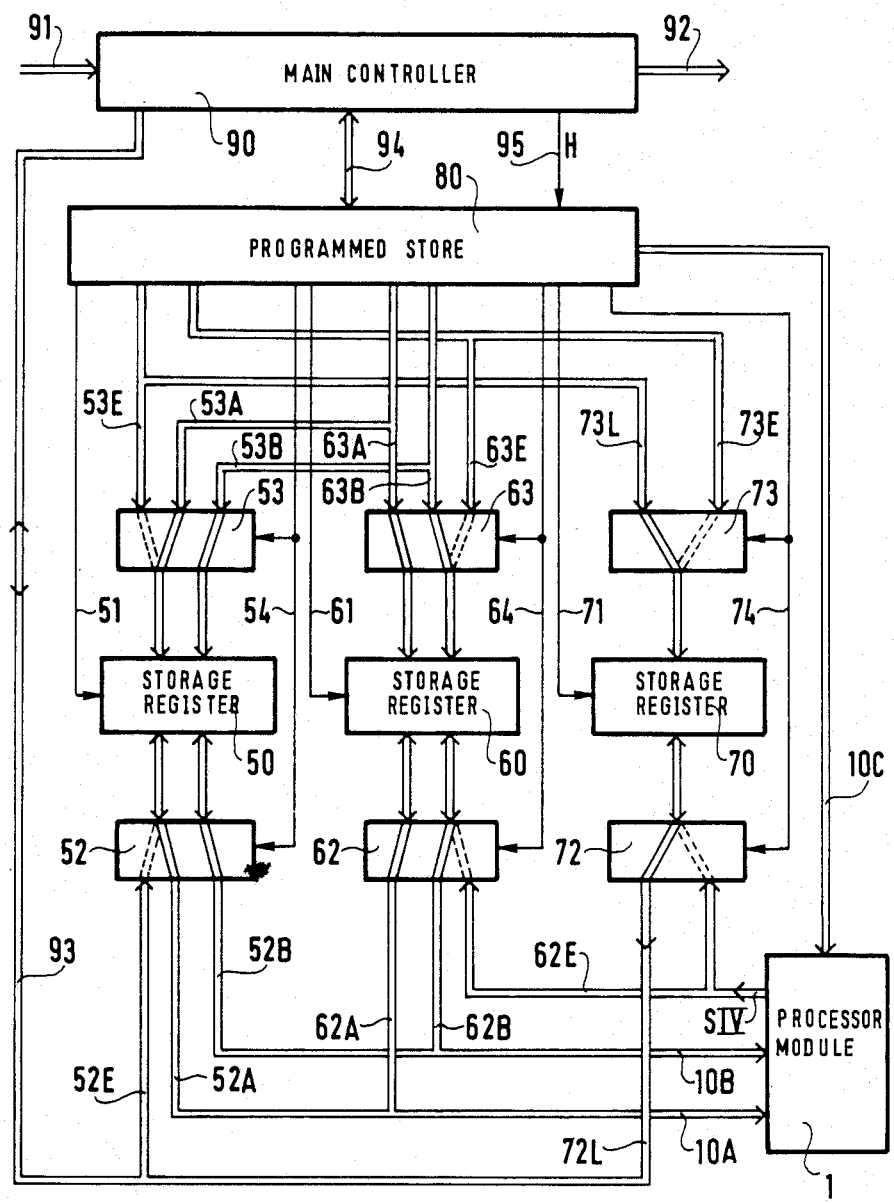
FIG. 3 is a block diagram of a two-dimensional discrete cosine transform calculation processor in accordance with the invention.

FIG. 3 schematically represents the processor for calculating the two-dimensional discrete cosine transform of a matrix block of N×N digital picture elements where N=8.

TABLE I

| | | | | | 24A | | | 24B | | | | | |
|---|---|---|---|---|---|---|---|---|---|---|---|---|---|
| H | 10A | 10B | SI | R1 | R2 | R3 | R1 | R2 | R3 | 20A | 20B | SII |
| 1 | X1 | X6 | . | . | . | . | . | . | . | . | . | . |
| 2 | X2 | X5 | L6 | 0 | . | . | . | . | . | . | . | . |
| 3 | X0 | X7 | L5 | 0 | . | L6 | 0 | . | . | L6 | 0 | . |
| 4 | X3 | X4 | L0 | 0 | . | L6 | 0 | . | L5 | 0 | L5 | L6 |
| 5 | X1 | X6 | L3 | L0 | . | L6 | 0 | . | L5 | L0 | L3 | L5 |
| 6 | X2 | X5 | L1 | L0 | . | L6 | L3 | . | L5 | L0 | L3 | M0 |
| 7 | X3 | X4 | L2 | L0 | . | L1 | L3 | . | L5 | L1 | L2 | M3 |
| 8 | X0 | X7 | M4 | L0 | . | L1 | L3 | L2 | L5 | L1 | L2 | M1 |
| 9 | . | . | M7 | L0 | M4 | L1 | L3 | L2 | M6 | L0 | L3 | M2 |
| 10 | . | . | . | M7 | M4 | L1 | M5 | L2 | M6 | L1 | L2 | M3 |
| 11 | . | . | . | M7 | M4 | L1 | M5 | L2 | M6 | M7 | M6 | M2 |
| 12 | . | . | . | M7 | M4 | L1 | M5 | L2 | M6 | M4 | M5 | N7 |
| 13 | . | . | . | M7 | M4 | L1 | M5 | L2 | M6 | M7 | M6 | N4 |
| 14 | . | . | . | M7 | M4 | L1 | M5 | L2 | M6 | M4 | M5 | N6 |
| 15 | . | . | . | M7 | M4 | L1 | M5 | L2 | M6 | M7 | M6 | N5 |
| 16 | . | . | . | M7 | M4 | L1 | M5 | L2 | M6 | M4 | M5 | N6 |
| 17 | X'1 | X'6 | . | M7 | M4 | L1 | M5 | L6 | M6 | M7 | M6 | N5 |
| 18 | X'2 | X'5 | L'6 | 0 | M4 | L1 | M5 | L2 | M6 | M4 | M5 | N7 |
| 19 | X'0 | X'7 | L'5 | 0 | M4 | L'6 | 0 | L2 | M6 | L'6 | 0 | N4 |
| 20 | X'3 | X'4 | L'0 | 0 | M4 | L'6 | 0 | L2 | L'5 | 0 | L'5 | L6 |
| 21 | X'1 | X'6 | L'3 | L'0 | M4 | L'6 | 0 | L2 | L'5 | L'0 | L'3 | L'5 |
| 22 | X'2 | X'5 | L'1 | L'0 | M4 | L'6 | L'3 | L2 | L'5 | L'0 | L'3 | M'0 |
| 23 | X'3 | X'4 | L'2 | L'0 | M4 | L'1 | L'3 | L2 | L'5 | L'1 | L'2 | M'3 |
| 24 | X'0 | X'7 | M'4 | L'0 | M4 | L'1 | L'3 | L'2 | L'5 | L'1 | L'2 | M'1 |
| 25 | . | . | M'7 | L'0 | M'4 | L'1 | L'3 | L'2 | M'6 | L'0 | L'3 | M'2 |

TABLE II

| | | | 43A | | | | | |
|---|---|---|---|---|---|---|---|---|
| H | SIII | R1 | R2 | 43B | 40A | 40B | SIV |
| 1 | . | . | . | . | . | . | . |
| 2 | . | . | . | . | . | . | . |
| 3 | . | . | . | . | . | . | . |
| 4 | . | . | . | . | . | . | . |
| 5 | C4 L6 | . | . | . | . | . | . |
| 6 | C4 L5 | C4 L6 | . | . | . | . | . |
| 7 | C4 M0 | C4 L6 | . | C4 L5 | C4 L6 | C4 L5 | . |
| 8 | C2 M3 | C4 L6 | C4 M0 | C4 L5 | C4 L6 | C4 L5 | M6 |
| 9 | C4 M1 | C2 M3 | C4 M0 | C4 L5 | C4 M0 | C4 M1 | M5 |
| 10 | S2 M2 | C2 M3 | C4 M0 | C4 M1 | C4 M0 | C4 M1 | P0 |
| 11 | C6 M3 | C2 M3 | C4 M0 | S2 M2 | C2 M3 | S2 M2 | P4 |
| 12 | S6 M2 | C6 M3 | C4 M0 | S2 M2 | C6 M3 | S6 M2 | P2 |
| 13 | C7 N7 | C6 M3 | C4 M0 | S2 M2 | . | . | P6 |
| 14 | S7 N4 | C7 N7 | C4 M0 | S2 M2 | C7 N7 | S7 N4 | . |
| 15 | C3 N6 | C7 N7 | C4 M0 | S2 M2 | . | . | P7 |
| 16 | S3 N5 | C3 N6 | C4 M0 | S2 M2 | C3 N6 | S3 N5 | . |
| 17 | C5 N6 | C3 N6 | C4 M0 | S2 M2 | . | . | P3 |
| 18 | S5 N5 | C5 N6 | C4 M0 | S2 M2 | C5 N6 | S5 N5 | . |
| 19 | C1 N7 | C5 N6 | C4 M0 | S2 M2 | . | . | P5 |
| 20 | S1 N4 | C1 N7 | C4 M0 | S2 M2 | C1 N7 | S1 N4 | . |
| 21 | C4 L'6 | C1 N7 | C4 M0 | S2 M2 | . | . | P1 |
| 22 | C4 L'5 | C4 L'6 | C4 M0 | S2 M2 | . | . | . |
| 23 | C4 M'0 | C4 L'6 | C4 M0 | C4 L'5 | C4 L'6 | C4 L'5 | . |
| 24 | C2 M'3 | C4 L'6 | C4 M'0 | C4 L'5 | C4 L'6 | C4 L'5 | M'6 |
| 25 | C4 M'1 | C2 M'3 | C4 M'0 | C4 L'5 | C4 M'0 | C4 M'1 | M'5 |

This processor is essentially based on the one-dimensional discrete cosine transform calculation processor module. It comprises, in addition to this module designated 1 and identical to that described with reference to FIG. 2, except that here its two input buses are 12 bits wide:

three stores or storage registers 50, 60, 70 connected to the module 1, a programmed store 80 controlling the storage registers 50, 60, 70 and the module 1, and a main controller circuit 90 driving the programmed store 80 and storing the picture elements which are transferred in successive blocks of 64 to the processor module and further storing the blocks of 64 coefficients P obtained as a result of the processing applied.

The processor module 1 is not described again. Its two data input buses and its output bus are designated by the references 10A, 10B and SIV used in FIG. 2. It is controlled by the programmed store 80 as indicated hereinabove, a control bus 10C carrying these control signals and the signal H from the controller circuit 90.

Each of the storage registers 50, 60 and 70 has the capacity to memorize a block of $8 \times 8$ words, that is 64 picture elements each of 8 bits in the case of register 50 or 64 coefficients each of 12 bits in the case of registers 60 and 70. They are individually controlled in write and read mode by the control programmed store 80 and receive a write/read control signal in the form of logic levels 0/1 on a connection 51, 61 or 71. With each of these storage registers 50, 60, 70 there are associated a first multiplexer 52, 62, 72 for incoming or outgoing words and a second multiplexer 53, 63, 73 for the addesses for these words, controlled simultaneously by a control signal delivered by the control programmed store 80 over an individual connection 54, 64 or 74. The storage registers 50 and 60 have dual access ports with bidirectional word input and output buses and the register 70 has a single access port, also with bidirectional input and output buses.

The word multiplexers 52 and 62 are analogous to one another; as schematically represented, each features an input bus for words entering the storage register and two output buses for words leaving the storage register, these buses being designated by the reference for the multiplexer with the suffix E for the storage register incoming words bus or the suffixes A and B for the buses carrying words leaving the register simultaneously. Their control signal provides a selective connection between their bus with the suffix E and one of the storage register input/output bidirectional buses or between their two buses with the suffixes A and B and the two register bidirectional input/output buses. In the case of the multiplexer 52, the input bus 52E is connected to the main controller circuit 90 and the output buses 52A and 52B are connected to the buses 10A and 10B of the processor module 1. In the case of the multiplexer 62, the input bus 62E is connected to the output bus SIV of the processor module 1 and its output buses 62A and 62B are also connected to the input buses 10A and 10B of the processor module 1.

The address multiplexers 53 and 63 are also analogous to one another. Each has three address input buses connected to the programmed store 80 designated by the reference for the multiplexer with the suffix E for one of the buses assigned to the addresses for writing incoming words into their storage register and the suffixes A and B for the other two buses assigned to the addresses for reading pairs of outgoing words out of their storage register. Each features two output buses connected to the two address buses of their dual access port storage register. They are individually controlled by the signal on the connection 54 or 64 in order selectively to connect the single bus assigned the suffix E and one of the output buses or to connect their other two input buses assigned the suffixes A and B and the two output buses, to deliver either the incoming word write addresses or the outgoing word pair read addresses.

The word multiplexer 72 provides selective connection either between the output bus SIV of the processor module 1 and the input/output bidirectional bus of the storage register 70 or between this input/output bidirectional bus of the storage register 70 and an output bus 72L connected to the controller circuit 90. The address multiplexer 73 provides selective connection either between a bus 73E assigned to the addresses for writing incoming words into the register 70 and the address bus of this single access port register or between this address bus of the register 70 and a bus 73L assigned to the addresses for reading outgoing words out of this register.

The controller circuit 90 transfers picture elements X in blocks of 64 to the storage register 50, receives the coefficients P resulting from the two-dimensional transform from the storage register 70 and monitors the overall process. It has an input bus 91 for sampled picture signal elements, an output bus 92 for the coefficients P of the signal processed, and a bidirectional bus 93 for transferring successive blocks of picture elements from the controller circuit 90 to the storage register 50 and blocks of coefficients P from the storage register 70 to the controller circuit 90, this bus 93 being connected to the aforementioned buses 52E and 72L. It further features a general processor control bus 94 to which are applied a signal requesting access from the controller circuit to the storage registers 50 and 70 transmitted to the programmed store 80, associated with a write/read signal in the control circuit 90 defining the direction of the transfer concerned, and a response signal transmitted to the controller circuit by the programmed store, corresponding to the processor "ready" function.

It further provides the clock signal H transmitted over a connection 95 which defines the process timing as well as, over connections which are not shown, the power supplies needed for the processor to operate.

The two-dimensional discrete transform of each block of $8 \times 8$ picture elements is calculated in several stages:

a first stage which is an initialization stage and corresponds to the transfer of $8 \times 8$ picture elements from the controller circuit 90 to the storage register 50, this register 50 being loaded at successive addresses delivered over the bus 53E, a second stage which is a processing stage for calculating 64 coefficients corresponding to the one-dimensional transform of the eight rows of eight picture elements, carried out in successive steps by the module 1 receiving the picture elements from the storage register 50 read at the successive addresses delivered over the buses 53A and 53B and delivering the resulting coefficients into the storage register 60 loaded at successive addresses delivered over the bus 63E, a third stage which is also a processing stage for calculating 64 final coefficients corresponding to the one-dimensional transform of the 64 coefficients resulting from the second stage appropriately arranged in eight groups of eight, being carried out in successive steps by the module 1 receiving from the storage register 60 appropriately addressed via buses 63A and 63B the pairs of coefficients obtained from the first processing operation and delivering to the storage register 70 addressed via the bus 73E the final coefficients, and a fourth stage which is a final stage for processing these 64 picture elements, corresponding to the transfer of the block of 64 final coefficients from the storage register 70, read and addressed via the bus 73L, to the controller circuit 90.

During these third and fourth stages which concern processing of each block of 64 picture elements, the first and second stages concerning the processing of the next block of 64 picture elements also take place.

It will be understood that, in order to obtain normalized final coefficients, and as described hereinbefore at the end of the description relating to the processor module 1, the bits defining the results produced by this module during each of the second and third stages of calculation of the two-dimeensional discrete transform of each block of 8×8 picture elements are shifted by two binary positions.

The present invention has been described with reference to a calculation carried out on sequences of eight digital data points. The same architecture may be used to carry out corresponding calculations on sequences of 16 or more digital data points, adopting for the processor module 1 (FIG. 2) storage registers of appropriate capacity and implementing the appropriate number of loops between its output SIV and the second adder 20 which it comprises:

It will be understood that various changes in the details, materials and arrangements of parts which have been herein described and illustrated in order to explain the nature of the invention may be make by those skilled in the art within the principle and the scope of the invention as expressed in the appended claims.

There is claimed:

1. Discrete cosine transform calculation processor for calculating the transform of a sequence of N digital data points where N=2n and n is an integer greater than two, comprising four successive calculation stages each assigned to a single operation and together constituting a processor module controlled by a programmed store, wherein a first stage, the module input stage, comprises a first addition/subtraction unit with two input buses receiving the data points to be processed in successive pairs and an output bus delivering the results; a second stage comprises a second addition/subtraction unit with two input buses and an output bus, first and second addressable storage registers each associated with a respective one of said input buses of said second addition/subtraction unit, and multiplexer circuits selectively loading said first and second registers from said output bus of said first stage or from an internal loopback bus of the module and feeding each input bus of said second addition/subtraction unit from said output bus of said first stage or the associated register; a third stage comprises a multiplication unit having an output bus and two input buses respectively connected to an associated addressable store holding sine and cosine function values and to said output bus of said second stage; and a fourth stage, the module output stage, comprises a third addition/subtraction unit having two input buses and an output bus to which said loopback bus is connected to load selectively said first and second registers, third and fourth addressable storage registers each associated with one of said input buses of said third addition/subtraction unit and loaded selectively from said output bus of said third stage, and multiplexer circuits selectively feeding each input bus of said third arithmetical addition/subtraction unit from said output bus of said third stage or the associated register.

2. Processor according to claim 1, for calculating the two-dimensional transform of blocks of N×N digital picture elements of a picture signal, further comprising a set of first, second and third stores individually controlled in read and write modes by said programmed store and associated with said module, a respective incoming and outgoing words multiplexer and a respective store addressing multiplexer for each store controlled by said programmed store to connect sequentially said first store, which has two access ports, in read mode and said second store, which also has two access ports, in read mode to said two input buses of said first stage of said module, and then said second store in write mode and then said third store in write mode, during the same stages, to said output bus of said output stage of said module to transfer the module result words.

3. Processor according to claim 2, further comprising a main controller circuit adapted to store blocks of N×N picture elements and N×N coefficients obtained by transforming each block, connected sequentially to said first store for loading the successive blocks of picture elements into this store and to said third store for unloading the blocks of N×N result words constituting said coefficients from said module.

* * * * *